(12) United States Patent
Parker

(10) Patent No.: US 9,016,636 B2
(45) Date of Patent: Apr. 28, 2015

(54) SLAT SUPPORT ASSEMBLY

(75) Inventor: Simon John Parker, Bristol (GB)

(73) Assignee: Airbus Operations Limited, Bristol (GB)

( * ) Notice: Subject to any disclaimer, the term of this patent is extended or adjusted under 35 U.S.C. 154(b) by 768 days.

(21) Appl. No.: 12/737,701

(22) PCT Filed: Aug. 27, 2009

(86) PCT No.: PCT/GB2009/051078
§ 371 (c)(1),
(2), (4) Date: Feb. 8, 2011

(87) PCT Pub. No.: WO2010/026410
PCT Pub. Date: Mar. 11, 2010

(65) Prior Publication Data
US 2011/0168849 A1    Jul. 14, 2011

(30) Foreign Application Priority Data
Sep. 3, 2008  (GB) .................................. 0816022.8

(51) Int. Cl.
*B64C 3/50* (2006.01)
*B64C 9/22* (2006.01)
*B64C 9/02* (2006.01)
*B64C 13/34* (2006.01)

(52) U.S. Cl.
CPC ... *B64C 9/22* (2013.01); *B64C 9/02* (2013.01); *B64C 13/34* (2013.01); *Y02T 50/44* (2013.01)

(58) Field of Classification Search
CPC .................................... B64C 9/22; B64C 9/02

USPC ........ 244/213, 214, 216, 34 R, 217; 74/89.32
See application file for complete search history.

(56) References Cited

U.S. PATENT DOCUMENTS

| 4,614,382 | A | | 9/1986 | Teramachi | |
|---|---|---|---|---|---|
| 4,753,402 | A | | 6/1988 | Cole | |
| 6,149,105 | A | * | 11/2000 | Jaggard | 244/214 |
| 8,628,045 | B2 | * | 1/2014 | Lauwereys et al. | 244/213 |
| 2009/0127402 | A1 | * | 5/2009 | Jaggard et al. | 244/213 |

FOREIGN PATENT DOCUMENTS

| EP | 0 227 643 | 7/1987 |
|---|---|---|
| EP | 0 230 681 | 8/1987 |

(Continued)

OTHER PUBLICATIONS

UK Search Report for GB No. 0816022.8, dated Dec. 9, 2008.
(Continued)

*Primary Examiner* — Valentina Xavier
(74) *Attorney, Agent, or Firm* — Nixon & Vanderhye P.C.

(57) ABSTRACT

A slat support assembly is disclosed. It comprises a slat support arm (3) having a plurality of bearing surfaces (28a, 28b, 29a, 29b) extending along its length, the slat (2) support arm being movable to deploy a slat attached to one end (4) of said slat support arm from a leading edge of an aircraft wing (1), and a plurality of bearings (27a, 27b, 31a, 31b) mountable within the wing, each bearing being in rolling contact with an associated bearing surface to support the slat support arm and guide it during deployment and retraction of the slat. At least some of the bearing surfaces and associated bearings are configured so that each bearing counteracts load applied to the slat support arm in more than one direction.

26 Claims, 7 Drawing Sheets

(56) References Cited

FOREIGN PATENT DOCUMENTS

| | | |
|---|---|---|
| EP | 0 291 328 | 11/1988 |
| GB | 593303 | 10/1947 |
| GB | 1 572 004 | 7/1980 |
| GB | 2 080 897 | 2/1982 |
| GB | 0 390 648 | 1/2004 |
| GB | 2 390 648 | 1/2004 |
| JP | 10-252763 | 9/1998 |

OTHER PUBLICATIONS

International Search Report for PCT/GB2009/051078, mailed Apr. 12, 2010.

Written Opinion of the International Searching Authority for PCT/GB2009/051078, mailed Apr. 12, 2010.

English translation of Japanese Office Action mailed Aug. 6, 2013 in JP 2011-525618.

* cited by examiner

US 9,016,636 B2

SLAT SUPPORT ASSEMBLY

This application is the U.S. national phase of International Application No. PCT/GB2009/051078, filed 27 Aug. 2009, which designated the U.S. and claims priority to GB Application No. 0816022.8, filed 3 Sep. 2008, the entire contents of each of which are hereby incorporated by reference.

INTRODUCTION

The present invention relates to a support assembly for supporting the slats on the leading edge of an aircraft wing. The invention also relates to an aircraft wing comprising at least one slat attached to a leading edge of the wing using the support assembly of the invention.

BACKGROUND

Aircraft need to produce varying levels of lift for take-off, landing and cruise. A combination of wing leading and trailing edge devices are used to control the wing coefficient of lift. The leading edge device is known as a slat. On larger aircraft there may be several slats spaced along the wing edge. During normal flight the slats are retracted against the leading edge of the wing. However, during take-off and landing they are deployed forwardly of the wing so as to vary the airflow across and under the wing surfaces. The slats usually follow an arcuate or curved path between their stowed and deployed positions. By varying the extent to which the slat is deployed along said path, the lift provided by the wing can be controlled.

An assembly is required to support and guide movement of a slat between stowed and deployed positions and a typical arrangement showing a cross-section through part of a wing 1 and a slat 2 in its stowed position is illustrated in FIG. 1. As can be seen from FIG. 1, the slat 2 is provided with an arcuate support arm or slat track 3 one end 4 of which is rigidly attached to the rear of the slat 2 and extends into the wing 1. The slat track 3 penetrates machined rib 5 and wing spar 6 forming the wing structure. The slat track 3 defines an arc having an axis and is mounted within the wing so that it can rotate about that axis (in the direction indicated by arrows "A" and "B" in FIG. 1) to deploy and retract the slat 2 attached to one end of the slat track 3.

To drive the slat rack 3 so as to deploy or retract the slat 2, a toothed slat rack 7 having an arcuate shape corresponding to the arcuate shape of the slat track 3 is mounted within a recess 3a on the slat track 3 and a correspondingly toothed drive pinion 8 is in engagement with the teeth 7a on the slat rack 7 so that when the drive pinion 8 rotates, the teeth 8a on the drive pinion 8 and the teeth 7a on the rack 7 cooperate to pivot or drive the slat rack 7 and the slat attached thereto, into a deployed position, i.e. in the direction of arrow "A" in FIG. 1. Typically, the slat track 3 rotates through an angle of 27 degrees between its fully stowed and fully deployed positions. Rotation of the pinion 8 in the opposite direction also drives the slat track 3, in the direction of arrow "B", back into its stowed position, as shown in FIG. 1.

The drive pinion 8 is mounted on a shaft 9 that extends along, and within, the leading edge of the wing 1. Several gears 8 may be rotatably mounted on the shaft 8, one for driving each slat 2 so that when the shaft 9 is rotated by a slat deployment motor close to the inboard end of the wing 1, all the slats are deployed together.

The slat track 3 has a generally square cross-sectional profile such that its upper and lower surfaces 3b, 3c each define a portion of a curved surface of a cylinder each having its axis coaxial with the axis of rotation of the slat track 3.

The slat track 3 is supported between roller bearings 10a, 10b both above and below the slat track 3 and the axis of rotation of each bearing 10a, 10b is parallel to the axis of rotation of each of the other bearings 10a, 10b and to the axis about which the slat track 3 rotates in the direction of arrows "A" and "B" between its stowed and deployed positions. The upper bearings 10a lie in contact with the upper surface 3b of the slat track 3 and the lower bearings 10b lie in contact with the lower surface 3c so that they support the slat track 3 and guide it during deployment and retraction. The bearings 10a, 10b resist vertical loads applied to the slat 2 during flight both in stowed and deployed positions and also guide movement of the slat track 2 during slat deployment and retraction.

It will be appreciated that the bearings 10a, 10b resist loads that are applied in the vertical direction only. By vertical loads are meant loads that act in a direction extending in the plane of the drawing or, in a direction acting at right-angles to the axis of rotation of each bearing.

It will be appreciated that there can be significant side loads acting on a slat 2 in addition to loads acting in a vertical direction during flight, especially as the slats 2 generally do not extend along the leading edge of the wing 1 exactly square to the direction of airflow. By side-loads is meant loads that act in a direction other than in a direction that extends in the plane of the drawing or, in other words, those loads that act in a direction other than at right-angles to the rotational axis of each bearing 10a, 10b.

To counteract side-loads, the slat track 3 is also supported by further bearings 11 disposed on either side of the slat track 3 as opposed to the vertical load bearings 10 mounted above and below the slat track 3. These side-load bearings 11 may not be rotational and may just comprise bearing surfaces, pads or cushions against which the side walls of the slat track 3 may bear when side loads are applied to the slat 2.

It is also conventional to provide at least one failsafe shaft 12, commonly referred to as a "funk pin" between each of the upper bearings 10a and which are positioned so as to support the slat track 3 in the event that one or more of the vertical load bearings 10 fail. The funk pins 12 may be non-rotatable shafts against which the slat track 3 slides or skids in the event of failure of a bearing 10. During normal operation the funk pins perform no function and a clearance gap exists between each pin and the surface of the slat track 3 so that the slat track 3 does not contact the funk pins except in the event of a bearing failure.

It will be appreciated that space for components within the wing structure close to the leading edge of the wing 1 is very limited, especially once the slat track 3 together with its vertical and side load bearings 10a, 10b,11, the drive pinion 8 and the funk pins 12 have all been installed. The requirement to house all these components places considerable design restrictions on the shape of the wing 1 in addition to increasing weight, manufacturing costs and complexities.

As the additional side-load bearings 11 and funk pins 12 are disposed between each of the upper and lower bearings 10a, 10b, these bearings must be spaced from each other in the circumferential direction about the axis of the slat track 3 by a distance which provides sufficient space between the bearings 10a, 10b to receive the side-load bearings 10a, 10b and the funk pins 12. As a consequence of this, a further disadvantage with the conventional assembly is that the slat track 3 must be relatively long to accommodate the desired maximum deployment angle for the slat 2 whilst ensuring that the slat track 3 is adequately supported by two vertical load bearings 10a above the slat track 3 and two vertical load bearings 10*b* below the slat track 3, even at maximum deployment. As a result of its extended length, the slat track 3 penetrates the spar 6 and so the free end of the slat track 3 must be received within a track can 13 that separates the slat track 3 from the fuel stored within the wing 1 behind the spar 6. However, it is undesirable to have openings in the spar 6 as this can weaken the wing structure. It will also be appreciated that the requirement for a track can 13 also presents additional problems and assembly issues with the need to provide an adequate seal where the track can 13 is attached to the spar 6 so as to prevent fuel leakage.

Embodiments of the invention seek to provide an aircraft slat support assembly that overcomes or substantially alleviates the problems referred to above.

SUMMARY OF THE INVENTION

According to the present invention, there is provided a slat support assembly comprising a slat support arm having a plurality of bearing surfaces extending along its length, the slat support arm being movable to deploy a slat attached to one end of said slat support arm from a leading edge of an aircraft wing, and a plurality of bearings mountable within the wing, each bearing being in rolling contact with an associated bearing surface to support the slat support arm and guide it during deployment and retraction of the slat, wherein at least some of the bearing surfaces and associated bearings are configured so that each bearing counteracts load applied to the slat support arm in more than one direction.

As each of the bearings is able to withstand loading applied to the slat support arm in multiple directions, additional side-load bearings or cushions are no longer required reducing the number of components required and the weight of the assembly. The reduction in components also provides more space within the leading edge of the wing and enables the bearings to be positioned closer together in the deployment direction, thereby allowing a shorter slat support arm to be used than is normally the case.

In one preferred embodiment, the slat support arm has a pair of adjacent upper bearing surfaces, each upper bearing surface being arranged at an angle relative to its adjacent upper bearing surface such that a bearing associated with one upper bearing surface does not share a common axis with the bearing associated with the other upper bearing surface.

The axis of rotation of each bearing may intersect at right angles to each other, although it is envisaged that the axis of rotation of each bearing may also intersect at an angle less, or more, than 90 degrees.

In one embodiment, the slat support arm has a lower pair of adjacent bearing surfaces, each lower bearing surface being arranged so that the axis of rotation of a bearing associated with one lower bearing surface is coaxial with the axis of rotation of a bearing associated with the other lower bearing surface.

In another embodiment, wherein the slat support arm has a second pair of lower adjacent bearing surfaces, each bearing surface of said second pair being arranged at an angle relative to its adjacent lower bearing surface such that a bearing associated with one lower bearing surface does not share a common axis with the bearing associated with its adjacent lower bearing surface.

In said other embodiment, the axis of rotation of each bearing associated with each lower bearing surface may intersect at right angles to each other, although other angles are also envisaged.

In another embodiment, the slat support arm is curved and rotatable about an axis that corresponds to its axis of curvature, at least the upper bearing surfaces having a width extending in the axial direction and the radial distance from the axis of the slat support arm to each of the upper bearing surfaces changing across the width of each of the upper bearing surfaces.

As the radial distance from the axis to the bearing surface varies across the width of the bearing surface, the bearings in rolling contact with the bearing surface are able to withstand loading in all directions including side-loads as well as vertical loads. By radial distance is meant the shortest distance from the axis of the slat support arm to the bearing face, i.e. the length of a line extending perpendicular from the axis of the slat support arm to the bearing face.

Typically, the radial distance changes linearly in a direction across the width of the bearing surface.

In a preferred embodiment, the bearing surface includes a pair of upper bearing faces.

Most preferably, the radial distance from the axis of the slat support arm to one upper bearing face increases in a direction across its width and the distance from the axis of the slat support arm to the other upper bearing face decreases in the same direction across its width.

In one embodiment, each upper bearing face is separated by a region having a width extending in the axial direction and the distance from the axis to said region is constant in a direction across its width.

In a preferred embodiment, the bearing surface also includes a pair of lower bearing faces.

Preferably, the lower bearing faces each have a width extending in the axial direction and the radial distance from the axis to each of said lower bearing faces is constant in a direction across the width of each lower bearing face.

A distance from the axis of the slat support arm to one lower bearing face may increase in a radial direction across its width and the distance from the axis to the other lower bearing face may decrease in the same direction across its width.

Conveniently, each lower bearing face may be separated by a region having a width extending in the axial direction and the radial distance from the axis to said region is constant in a direction across the width of each lower bearing face.

In a preferred embodiment, each upper bearing face is spaced from a lower bearing face in a radial direction.

The radial distance from the axis of the slat support arm to one bearing face may increase in a direction across its width whereas the distance from the axis to the other bearing face spaced from said one bearing face in a radial direction may decrease in the same direction across its width.

Typically, at least one bearing is in rolling contact with each bearing face. Ideally, there are two or even three bearings in rolling contact with each face.

In a preferred embodiment, the axis of rotation of each bearing is parallel to the bearing face with which the bearing is in contact, although it also envisaged that the axis of rotation of the bearings could be parallel to the axis of the slat support arm, in which case the surfaces of the bearing are angled so as to make rolling contact with their corresponding bearing faces.

The bearings may, advantageously, be mounted in a bearing yoke, the yoke being configured for attachment to the wing structure of an aircraft.

The bearing yoke preferably comprises a frame having an aperture to receive the slat support arm, and means to mount the bearings in the yoke such that they lie in rolling contact with the bearing surface.

In one embodiment, each bearing may be rotatably mounted on a shaft having a cap at one end. The other end of the shaft remote from the cap can be threaded to engage a corresponding threaded hole in the yoke and the yoke may have an opening to receive and support the cap when said threaded end of the shaft is in threaded engagement with the threaded hole in the yoke.

In one embodiment, a seal may be formed between the cap and the yoke with 'o' ring seals to prevent the ingress of dirt into the bearing between the cap and the yoke.

Conveniently, tool engagement means are provided on the cap to enable the shaft to be rotated so as to couple the threaded portion of the shaft to the yoke.

In one embodiment, a plurality of yokes are spaced from each other by an angle about the axis of the slat support arm, each yoke housing a pair of upper and a pair of lower bearings.

In one embodiment, the free end of the slat support arm remote from the slat is chamfered.

The slat support assembly preferably comprises a groove in the slat support arm and a slat rack mounted to the slat support arm in the groove for cooperation with a drive pinion configured to rotate the slat track about its axis for deployment and retraction of the slat.

According to another aspect of the invention, there is provided an aircraft wing having a slat and a slat support assembly according to the invention, the slat support arm being configured such that it disengages the yoke spaced furthest away from the leading edge of the wing when the slat has reached its fully deployed position.

DESCRIPTION OF THE DRAWINGS

Embodiments of the invention will now be described, by way of example only, and with reference to FIGS. 2 to 7 of the accompanying drawings, in which.

DESCRIPTION OF THE PREFERRED EMBODIMENTS

Figure 1:
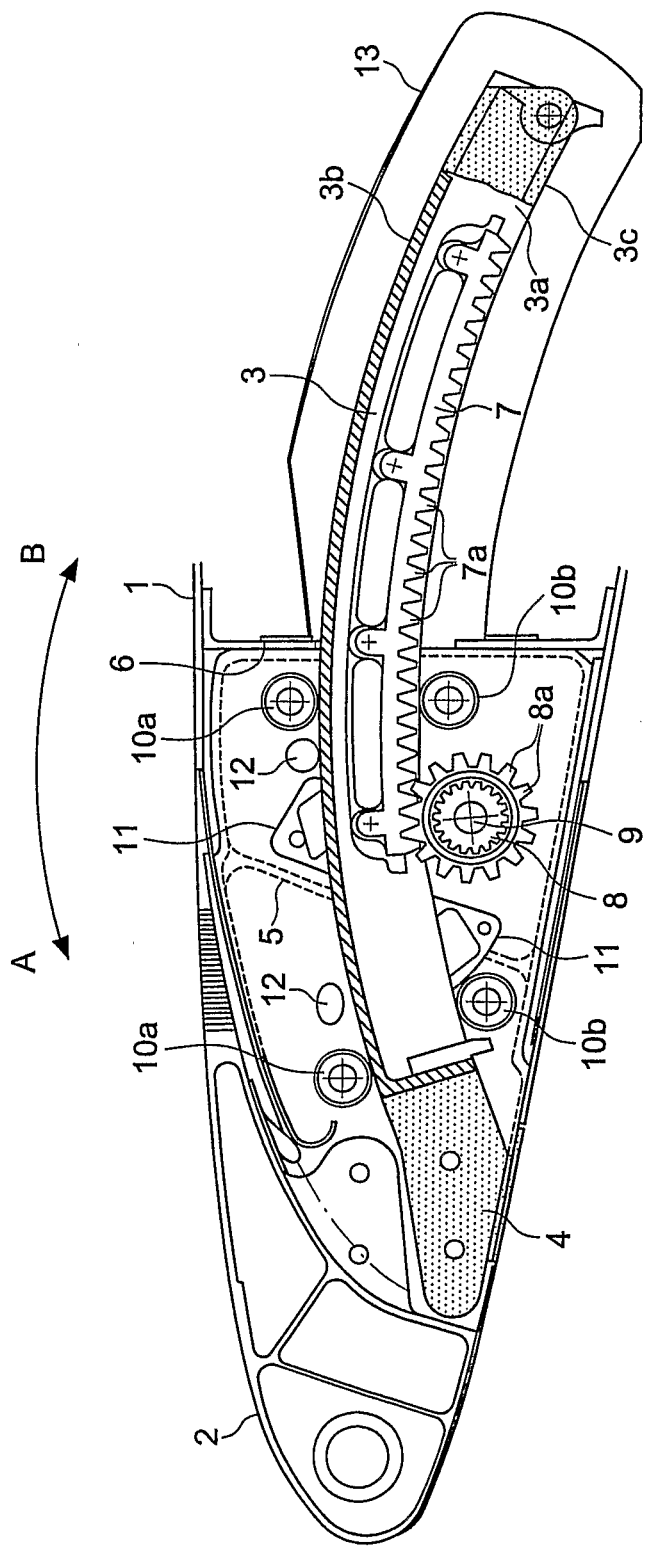
FIG. 1 is a prior art side sectional view through a portion of a leading-edge of a wing of an aircraft with a slat shown in its stowed position.

FIG. 1 represents a prior art view of a portion of a leading edge of a wing and slat and has already been described above.

Figure 2:
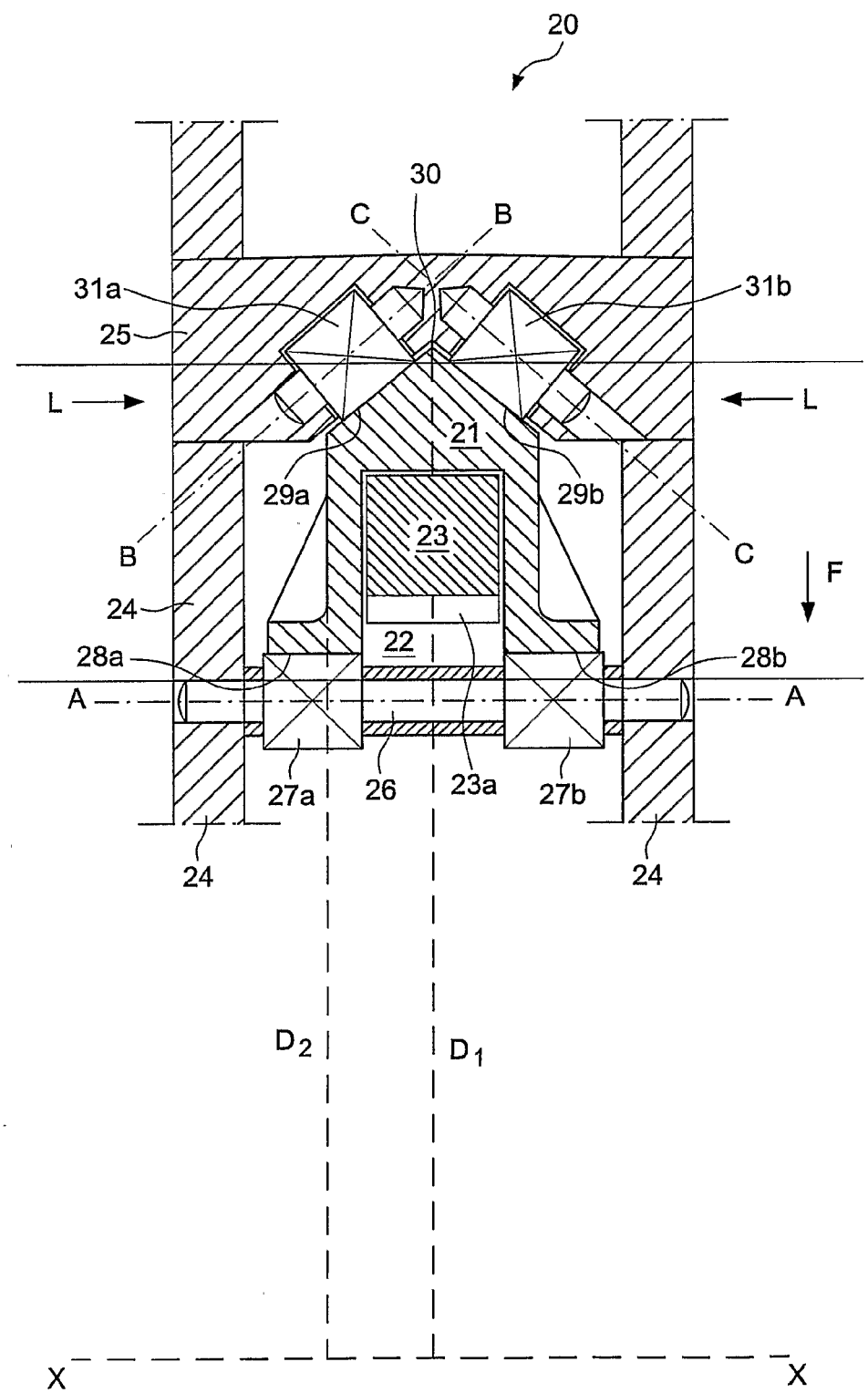
FIG. 2 is a schematic cross-sectional view through a slat support arm, and bearings to illustrate the principle of the present invention.
Figure 3:
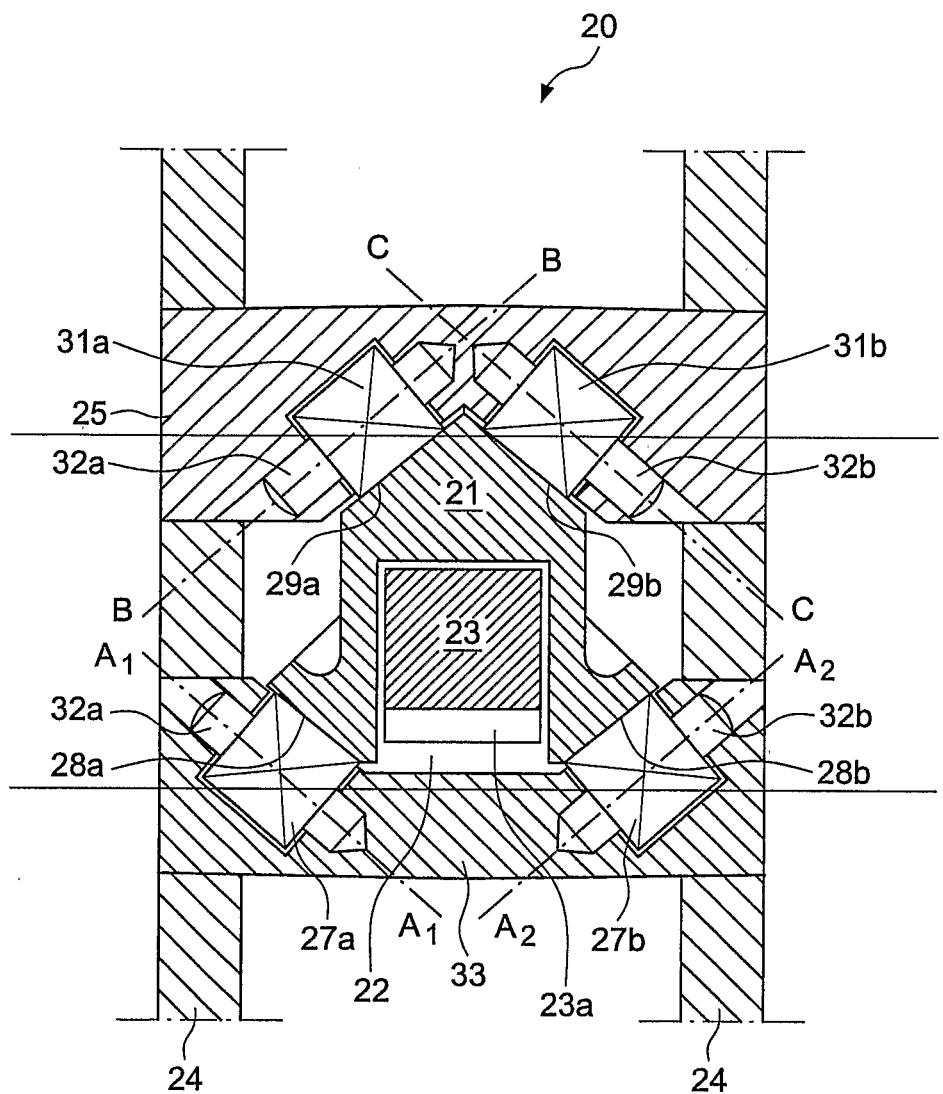
FIG. 3 is a schematic cross-sectional view of a modification of the slat support arm configuration shown in FIG. 2.

Referring now to FIGS. 2 and 3, there is shown a simplified cross-sectional view through a slat track support assembly 20 according to an embodiment of the invention. This cross-section is taken through the curved slat support arm or slat track 21 viewed from the front, i.e. looking towards the leading edge of the wing, and so the slat itself, which is attached to the front end of the slat support arm 21 is not visible in these drawings and the slat support arm rotates 21 about its theoretical centre or axis (not shown in the Figures), in a direction out of the sheet towards the viewer, when a slat 2 attached to the slat support arm 21 is deployed.

As in the prior art view of FIG. 1, the curved slat support arm 21 has an arcuate groove or recess 22 along its length in which is received a slat rack 23 attached to the slat support arm 21. The slat rack 23 has teeth 23a extending along its lower exposed surface for engagement with a drive pinion (not shown but similar to drive pinion 8 shown in FIG. 1), to drive the slat support arm 21 between slat deployed and slat retracted positions, as is conventional.

The slat support arm 21 extends within a space formed between two ribs 24 forming part of the structure of the aircraft wing and an upper bearing yoke 25 is rigidly attached to and extends between the ribs 24. A shaft 26 is also rigidly mounted and extends between the ribs 24 below the slat support arm 21. Two bearings 27a,27b are rotatably mounted on the shaft 26 and lie in rolling contact with corresponding bearing surfaces 28a,28b on the slat support arm 21. It will be appreciated that the axis of rotation (A-A—see FIG. 2) of the bearings 27a, 27b, and corresponding bearing surfaces 28a, 28b are both parallel to the axis of rotation (X-X) of the slat support arm 21 as it moves between its deployed and retracted positions. These bearings are therefore only able to resist loads applied to the slat support arm 21 in a vertical direction, i.e. in the direction of arrow "F" in FIG. 2, but cannot support any side loading of the slat support arm 21. However, the upper side of the slat support arm 21 is divided into two bearing surfaces 29a,29b that each extend upwardly from the side of the slat support arm 21 at an angle towards a tip 30. In effect, the upper edge of the slat support arm 21 has a triangular profile in cross-section, although it is envisaged that the bearing surfaces 29a,29b need not meet at a tip and there could be a region between the two bearing surfaces that extends parallel to the axis of the slat support arm 21.

A pair of upper bearings 31a, 31b are rotatably mounted on separately angled shafts 32a, 32b, received within the upper bearing yoke 25 and bearing 31a lies in rolling contact with angled bearing surface 29a whilst bearing 31b lies in rolling contact with angled bearing surface 29b. The shafts 32a,32b are angled such that the axis of rotation (B-B and C-C) of each bearing 31a,31b is parallel to its corresponding bearing surface 29a,29b. It will be appreciated that, as a result of orientating the upper bearings 31a,31b so that the contact face between the bearings 31a,31b and their corresponding bearing surfaces 29a, 29b, are no longer parallel to the axis of rotation of the slat support arm 21, the upper bearings 31a,31b are now able to counteract side-loading forces applied to the slat support arm 21, i.e. forces applied in the direction of arrows "L" in FIG. 2, in addition to vertical loads. Therefore, the additional side-load bearings conventionally used in the prior art slat support assemblies are no longer required, thereby reducing weight and saving space and cost.

It will be appreciated that as the bearing surfaces 29a,29b are not parallel to the axis of rotation of the slat support arm, the radial distance from the axis X-X of the slat support arm changes in a direction along the axis between a maximum distance $D_1$ and a minimum distance $D_2$, as indicated in FIG. 2. It will be noted that the radial distance decreases in a first direction (right to left, as shown in FIG. 2) for the lefthand bearing surface 29a and that the radial distance decreases in a second direction (left to right, as shown in FIG. 2) for the righthand bearing surface 29b.

FIG. 3 shows a similar arrangement to that shown in FIG. 2, except that the lower bearings 27a, 27b are arranged in the same way as the upper bearings 31a, 31b (and now have separate axes $A_1$-$A_1$ and $A_2$-$A_2$) and the lower bearing surfaces 28a, 28b of the slat support arm 21 are also angled relative to the axis of rotation of the slat support arm 21. Each of the lower bearings 27a, 27b are also rotatably mounted on individual shafts 32a, 32b received in a lower yoke 33 that extends between ribs 24 of the aircraft wing. In this embodiment, both the lower and upper bearings 27a,27b; 31a, 31b are able to counteract both side and vertical loads applied to the slat support arm 21.

Although the lower and/or upper bearing surfaces 28a,28b; 29a,29b are shown as being angled at 45 degrees relative to the axis about which the slat support arm 21 rotates, it will be appreciated that the bearing surfaces 28a,28b;29a,29b could assume any angle between 0 and 90 degrees depending on the loading that the bearings need to withstand. For example, the side-loading forces will be substantially less than the vertical loading forces and so the bearing surfaces will be angled so that their associated bearings are positioned so as to counteract a greater vertical loading force than a side-loading force.

Figure 4:
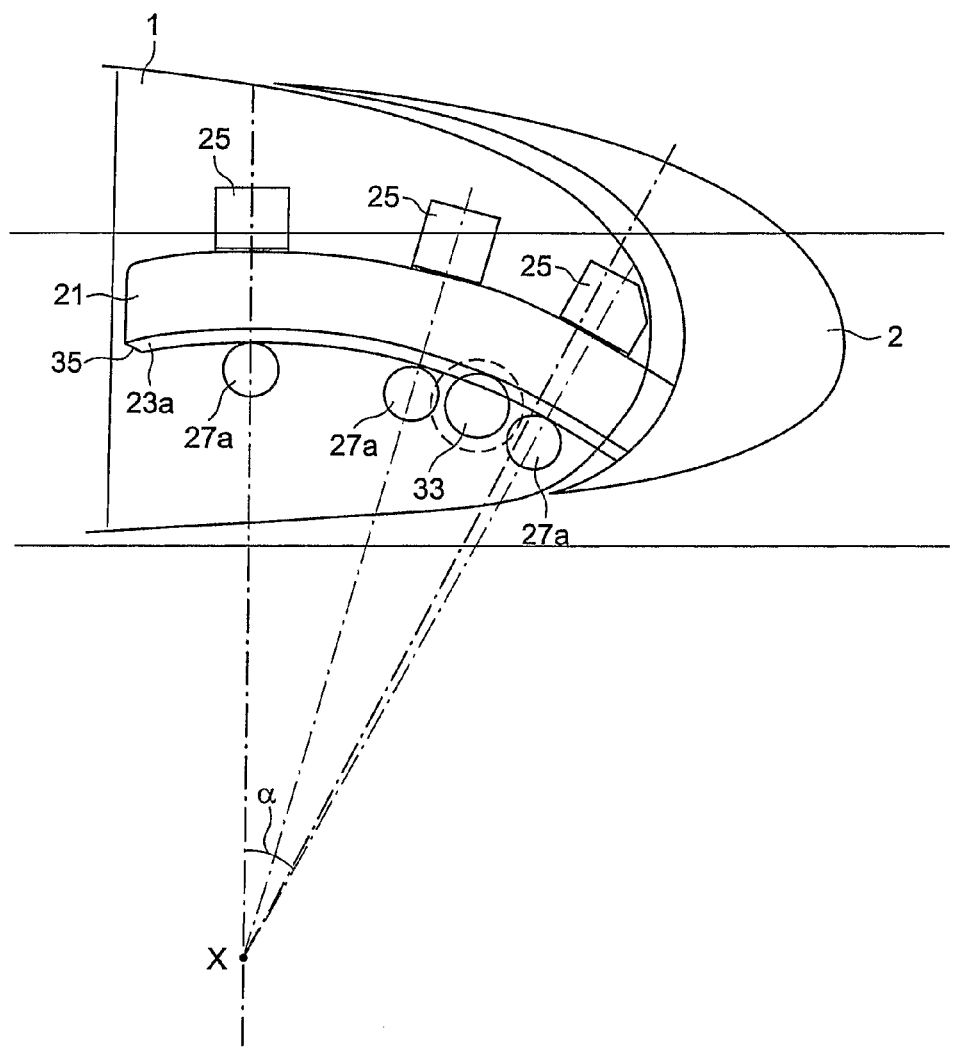
FIG. 4 is a schematic side sectional view through the leading edge of a wing and slat with the slat in its retracted position.

A generalised side view of the arrangement shown in FIG. 2 is illustrated in FIG. 4, and in which the slat 2 can be seen in its retracted position in which it sits against the leading edge of the wing 1. In this embodiment, there are three upper yokes 25 arranged spaced by an angle about the theoretical centre or axis of rotation "X" of the slat support arm 21 above the slat support arm 21, each of which receive two bearings 31a, 31b, as shown and described with reference to FIG. 2. Also shown is three lower bearings 27a spaced from each other by an angle about the axis "X" of rotation of the slat support arm 21 and corresponding to each of the upper sets of bearings 31a, 31b. A drive pinion 33 in engagement with the teeth 23a on the slat rack 23 is also shown positioned between two of the lower bearings 27a to drive the slat support arm 21 between its deployed and retracted positions.

Figure 5:
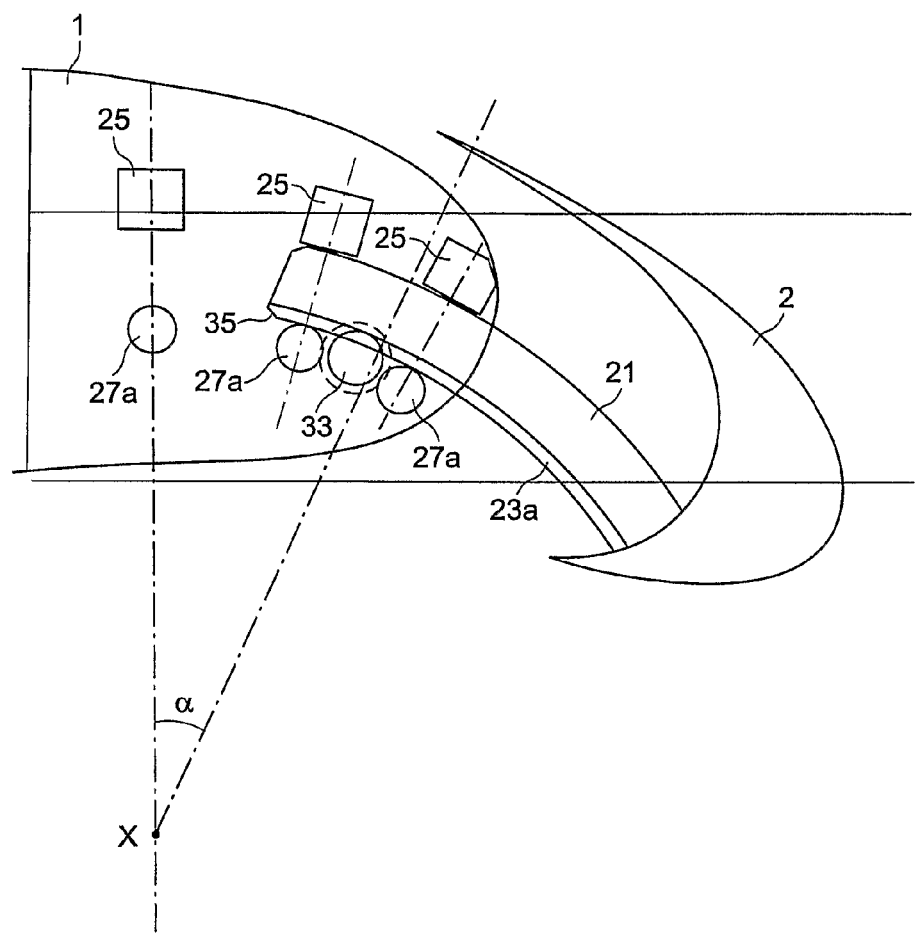
FIG. 5 is a schematic side sectional view through the leading edge of a wing and slat as shown in FIG. 4, but with the slat in its maximum deployed position.

The same generalised side view is shown in FIG. 5, except that in this view, the slat 2 is shown in its maximum deployed position. To achieve this position, the slat support arm 21 has rotated about its axis "X" by an angle of approximately 24 degrees (indicated by angle α in FIGS. 4 and 5). It can be seen that, in this position, the trailing set of bearings 27a,27b; 31a,31b, i.e. those furthest from the leading edge of the wing or the slat 2, are redundant because the slat support arm 21 is no longer engaged with these bearings and is entirely supported by the remaining two sets of bearings closer to the leading edge of the wing 1. It is envisaged that this trailing set of bearings could be omitted altogether, although it may be advantageous to provide the trailing set of bearings to provide additional support for the slat during cruise, when the slat 2 is retracted. To guide the free end of the slat support arm 21 back into engagement with the trailing set of bearings when the slat support arm 21 is retracted, the free end of the slat support arm 21 may have a slight chamfer or beveled surface 35.

As there is no longer any requirement to provide additional side-load bearings between the vertical load bearings, the bearing sets can be placed much closer together, thereby saving space within the wing structure and allowing for a consequential reduction in the length of the slat support arm 21 because the slat support arm 21 can still be supported by two bearing sets even at full deployment of the slat 2. As a consequence of the reduction in the length of the slat support arm 21, there is no longer any need to penetrate the spar 6 and a track can is also no longer required. As an additional advantage, it is also possible to arrange corresponding upper and lower bearings so that a line extending from the theoretical centre or axis of rotation of the slat support arm 21 extends through the axis of both the lower and upper bearings because the bearings can be placed on the true radial centre lines that pass through the theoretical centre of rotation of the slat support arm, thereby improving load carrying capability. In the prior art configuration, this is not possible due to the shortage of space and the requirement to provide additional side-load bearings between the vertical load bearings.

Figure 6:
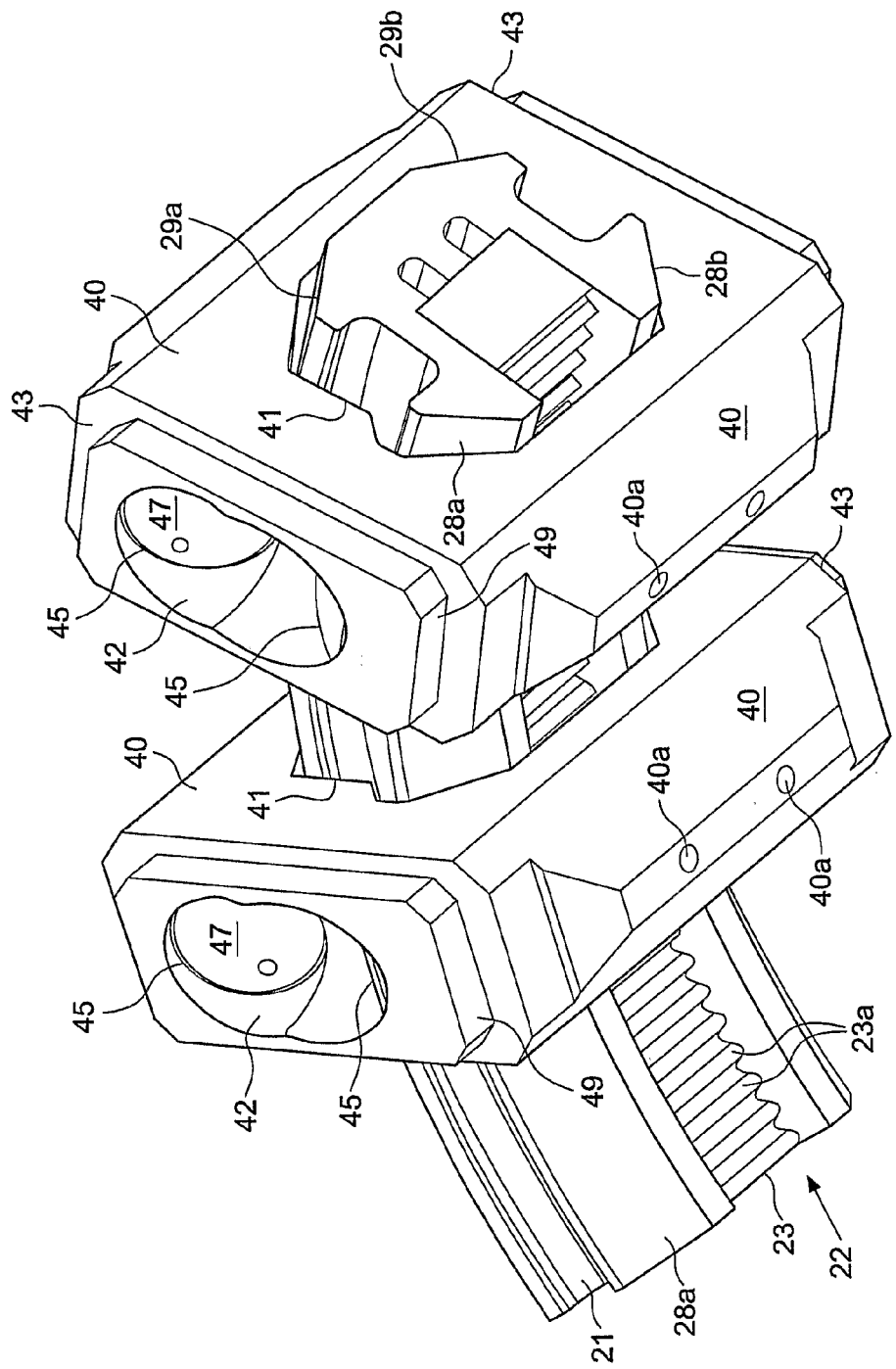
FIG. 6 is a perspective view of a more practical application of the embodiment of FIG. 3.
Figure 7:
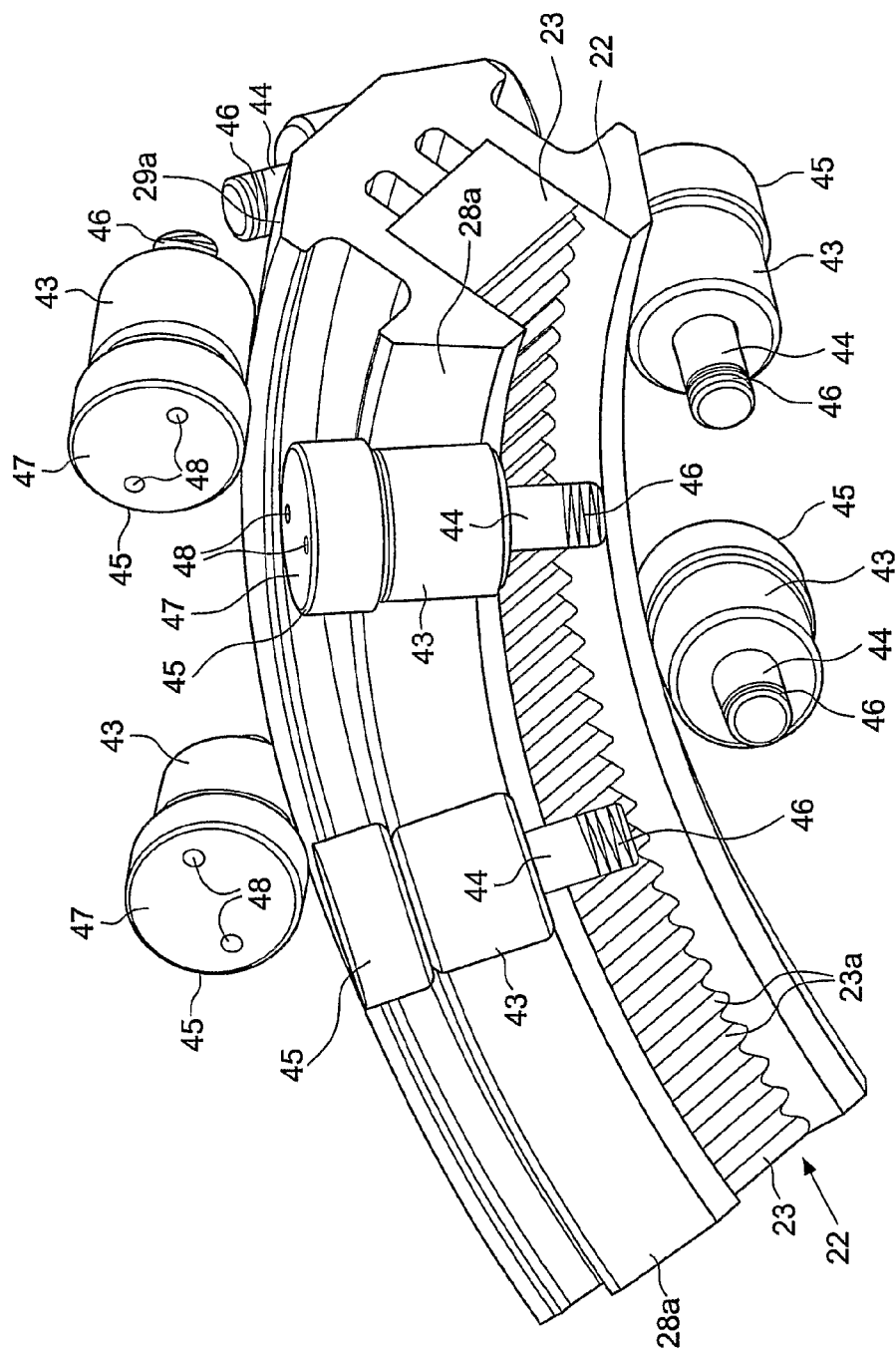
FIG. 7 is a perspective view similar to that of FIG. 6, but with the bearing yokes removed for clarity.

Reference will now be made to FIGS. 6 and 7 which illustrate a more practical configuration of the generalised embodiment of FIG. 3 and in which can be seen the slat support arm 21 having upper bearing faces 29a, 29b and lower bearing faces 28a, 28b. The slat rack 23 is received in groove 22 and has teeth 23a for engagement with a drive pinion (not shown).

The bearings 27a,27b; 31a,31b of each set are mounted within a unitary yoke 40 which has an opening 41 shaped to receive the slat support arm 21 therethrough. The yoke 41 has recesses 42 in its end faces 43 to facilitate insertion and removal of the bearings 27a,27b; 31a, 31b, which can be seen more clearly in FIG. 7, which shows the same view as FIG. 6, but with the yokes 40 omitted for clarity. Each bearing 27a, 27b; 31a, 31b comprises a bearing element 43 (see FIG. 7) which is rotatably mounted on a shaft 44. The shaft 44 has an end cap or head portion 45 and the end of the shaft 44 remote from the cap 45 is part-threaded at 46 for threaded engagement with a corresponding threaded aperture (not shown) in the yoke 40, when the shaft 44, together with the bearing element 43 mounted thereon, is inserted through the aperture 42 in the end faces of the yoke 40. The cap 45 is supported within the recess 42 in the yoke and may be provided with a sealing element to seal any gap between the cap 45 and the wall of the recess 42 to prevent ingress of dirt. The upper face 47 of the cap 45 may be provided with holes 48 for engagement with a tool for inserting it into and mounting it to the yoke 40. The yoke 40 may also be provided with drainage holes 40a to allow egress of water out of the yokes 40.

The end faces 43 of the yoke 40 are provided with shoulders 49. It is envisaged that these will be shaped to enable each yoke 40, complete with its internally mounted bearings 27a, 27b, 31a, 31b, to be inserted into the aircraft wing 1 during assembly so that the shoulders 49 engage between corresponding ribs 5, thereby locating respective yokes 40 in the correct position to receive the slat support arm 21.

Embodiments of the invention essentially reduce the number of bearings required over a conventional slat support assembly by up to 50%, because the side-loads are now counteracted by the same bearings that counteract the vertical loads and so there is no longer any need to provide separate side-load bearings. This may enable a significant weight reduction and/or greatly reduce the design space constraints in the densely populated leading edge of the wing.

It will be appreciated that the foregoing description is given by way of example only and that modifications may be made to the slat support assembly of the present invention without departing from the scope of the appended claims. For example, it should be noted that, in the above described embodiment of the invention, the slat support arm is curved about an axis and rotates about said axis between its stowed and deployed positions. However, it is envisaged that the slat support arm could follow a non-circular path such as an elliptical or linear path and/or that the slat support arm may not be curved.

The invention claimed is:
1. A slat support assembly for an aircraft wing, said assembly comprising:
a slat support arm having a plurality of bearing surfaces extending along a length of said arm, the slat support arm movable about a slat support arm axis to deploy and retract a slat attached to one end of said slat support arm from a leading edge of an aircraft wing; and a plurality of bearings mountable within the wing, each bearing in rolling contact with an associated bearing surface to support the slat support arm and guide the slat during deployment and retraction, wherein a plurality of the associated bearings have axes of rotation that are not parallel to the slat support arm axis.

2. A slat support assembly for an aircraft wing, said slat assembly comprising:
a slat support arm having a plurality of bearing surfaces extending along a length of said arm, the slat support arm being movable about a slat support arm axis to deploy and retract a slat attached to one end of said slat support arm from a leading edge of an aircraft wing; and
a plurality of bearings mountable within the wing, each bearing in rolling contact with an associated one of the bearing surfaces to support the slat support arm and guide the slat during deployment and retraction, wherein at least some of the bearing surfaces and associated bearings are configured so that each bearing counteracts a load applied to the slat support arm in more than one direction, wherein said bearing surfaces include a pair of adjacent upper bearing surfaces, each of said pair of upper bearing surfaces is at an obtuse angle relative to the other upper bearing surface of the pair wherein the obtuse angle is along a direction perpendicular to the slate support arm and wherein a rotational axis of said bearing associated with one of the pair of upper bearing surfaces is not parallel to a rotational axis with the bearing associated with the other of the pair of upper bearing surfaces.

3. A slat support assembly according to claim 2, wherein said bearing surfaces include a lower pair of adjacent bearing surfaces, each lower bearing surface is arranged so that the axis of rotation of said bearing associated with one lower bearing surface is coaxial with the axis of rotation of said bearing associated with the other lower bearing surface.

4. A slat support assembly according to claim 2, wherein the slat support arm has a second pair of lower adjacent bearing surfaces, each bearing surface of said second pair is arranged at an angle relative to the adjacent lower bearing surface such that said bearing associated with one lower bearing surface does not share a common axis with the bearing associated with the adjacent lower bearing surface.

5. A slat support assembly according to claim 2, wherein the slat support arm is curved and rotatable about a slat support arm axis that corresponds to the axis of curvature of said arm, at least the upper bearing surfaces each have a width extending in an axial direction and
wherein a radial distance from the axis of curvature of the slat support arm to each of the upper bearing surfaces varies across the width of each of the upper bearing surfaces.

6. A slat support assembly according to claim 5, wherein said radial distance varies linearly in a direction across the width of each upper bearing surface.

7. A slat support assembly according to claim 5, wherein the radial distance from the axis of the slat support arm to one upper bearing surface increases in a direction across the width and the distance from the axis of the slat support arm to the other upper bearing surface decreases in the same direction across the width.

8. A slat support assembly according to claim 7, wherein each upper bearing surface is separated by a region having a width extending in the axial direction and the distance from the axis to said region is constant in a direction across a width of said region.

9. A slat support assembly according to claim 5, wherein the bearing surface also includes a pair of lower bearing surfaces.

10. A slat support assembly according to claim 9, wherein the lower bearing surfaces each have a width extending in the axial direction of said axis of curvature and the distance from the axis of curvature to each of said lower bearing surfaces is constant in a direction across the width of each lower bearing surface.

11. A slat support assembly according to claim 9, wherein a distance from the axis of curvature of the slat support arm to one lower bearing surface increases in a direction across said one lower bearing surface width and the distance from the axis to the other lower bearing face decreases in the same direction across said other lower bearing surface width.

12. A slat support assembly according to claim 11, wherein said lower bearing surfaces are separated by a region having a width extending in the axial direction and the distance from the axis to said region is constant in a direction between the two lower bearing surfaces.

13. A slat support assembly according to claim 11, wherein each upper bearing surface is spaced from a corresponding lower bearing surface in a radial direction.

14. A slat support assembly according to claim 13, wherein the distance from the axis of said slat support arm to one of the bearing surfaces increases in a direction across said width and the distance from the axis of said slat support arm to the other bearing surface is spaced from said one bearing surface in an axial direction and said width of said other bearing surface decreases in the same direction across said width.

15. A slat support assembly according to claim 9, wherein at least one bearing is in rolling contact with each bearing surface.

16. A slat support assembly according to claim 15, wherein the axis of rotation of each bearing is parallel to the bearing surface with which the bearing is in contact.

17. A slat support assembly according to claim 1, wherein said bearings are mounted in a bearing yoke, and the yoke is configured for attachment to the wing structure of an aircraft.

18. A slat support assembly according to claim 17, wherein the bearing yoke comprises a frame having an aperture to receive the slat support arm, and means for mounting the bearings in the yoke such that said bearings lie in rolling contact with the bearing surface.

19. A slat support assembly according to claim 18, wherein each bearing is rotatably mounted on a shaft having a cap at one end.

20. A slat support assembly according to claim 19, wherein the other end of the shaft remote from the cap is threaded to engage a corresponding threaded hole in the yoke, the yoke having an opening to receive and support the cap when said threaded end of the shaft is in threaded engagement with the threaded hole in the yoke.

21. A slat support assembly according to claim 20, wherein comprising a seal between the cap and the yoke to prevent the ingress of dirt into the bearing between the cap and the yoke.

22. A slat support assembly according to claim 21, comprising tool engagement means, located on the cap, for enabling the shaft to be rotated so as to couple the threaded portion of the shaft to the yoke.

23. A slat support assembly according to claim 17, comprising a plurality of yokes, said yokes spaced from each other by an angle about the axis of the slat support arm, each yoke housing a pair of upper and a pair of lower bearings.

24. A slat support assembly according to claim 23, wherein the free end of the slat support arm remote from the slat is chamfered.

25. A slat support assembly according to claim 1 comprising a groove in the slat support arm and a slat rack is mounted to the slat support arm in the groove for cooperation with a drive pinion, said rack and drive pinion configured to rotate the slat track about the slat support arm axis for deployment and retraction of the slat.

26. An aircraft wing having a slat and a slat support assembly according to claim 23, the slat support arm configured to disengage the yoke spaced furthest away from the leading edge of the wing when the slat has reached said fully deployed position.

\* \* \* \* \*